April 13, 1954

E. E. AYLOR 2,675,199

ROTOR KITE

Filed Jan. 19, 1950

INVENTOR.
ELMO EDISON AYLOR
BY Charles F. Schroeder
Agent

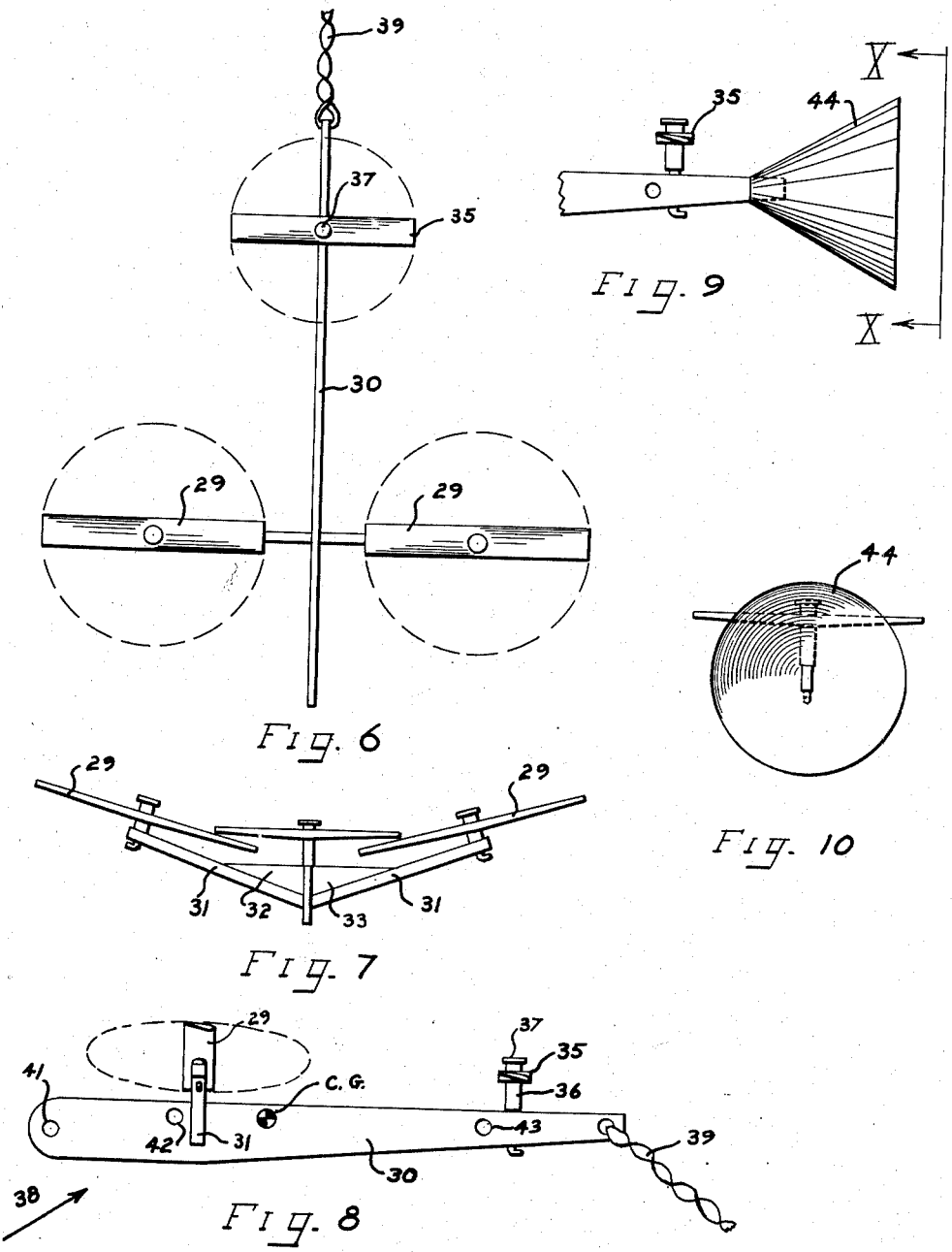

Patented Apr. 13, 1954

2,675,199

UNITED STATES PATENT OFFICE 2,675,199

ROTOR KITE

Elmo Edison Aylor, Chicago, Ill.

Application January 19, 1950, Serial No. 139,501

5 Claims. (Cl. 244—154)

The present invention relates to wind driven flying devices and more particularly to a highly stable flying device which has its lifting power developed by wind driven rotor means.

Wind driven flying devices of the prior art were usually of the type designed with the idea that some form of sail section or wing member was required to provide sufficient lifting force to overcome the static weight of the respective devices.

In the field of machine driven flying apparatus, it has been found that beside wing sections, rotor means alone can be utilized to provide lifting forces sufficient to effectively cause the apparatus to fly. A principle which has been very little utilized, however, is that of mounting wind-operated rotors on a body in such a manner that driving winds will develop flight forces. In some few instances where this principle has been used, however, considerable difficulty has been experienced because of the very poor stability after the apparatus has been lofted. In the relatively few instances where the above principle has been utilized, the devices have been highly impractical because sustained flight characteristics could not be readily obtained. In the present invention, however, wind driven rotors are used in flying apparatus without such detrimental effects.

The practical embodiments herein set forth are in the form of kites each of which has a pair of lifting rotors laterally disposed with respect to the device while associated elements provide means for establishing flight stabilization.

It is an object of this invention to provide a novel flying device which can be flown by utilizing lifting forces developed solely by wind driven rotors.

It is another object of this invention to provide a novel kite which is capable of stable flight by utilization of wind driven rotors without need for the association of wing members or sail sections.

It is a further object of the present invention to provide a novel kite in which stabilizing drag forces may be developed by either moving or stationary elements on the kite.

It is still another object of the present invention to provide a kite which may have halter means adapted thereto to enable controlled flight.

Another and still further object of the present invention is to provide a novel kite capable of stable flight without use of sail sections and which at the same time is composed of structurally simple elements easy to manufacture and assemble.

The novel features which I believe to be characteristic of my invention are set forth with particularity in the appended claims. My invention, however, both as to its organization and method of operation, together with further objects and advantages thereof, may best be understood by reference to the following description taken in connection with the accompanying drawings, in which:

Figure 6 is a top plan view of another embodiment of the present invention;

Figure 7 is a front elevational view of the kite shown in Figure 6;

Figure 8 is a side elevational view of the kite shown in Figure 6;

Figure 9 is a partial side elevational view of the rear portion of a kite illustrating another embodiment of the present invention;

Figure 10 is a view of the structural arrangement illustrated in Figure 9 as taken on line X—X.

Figure 1:
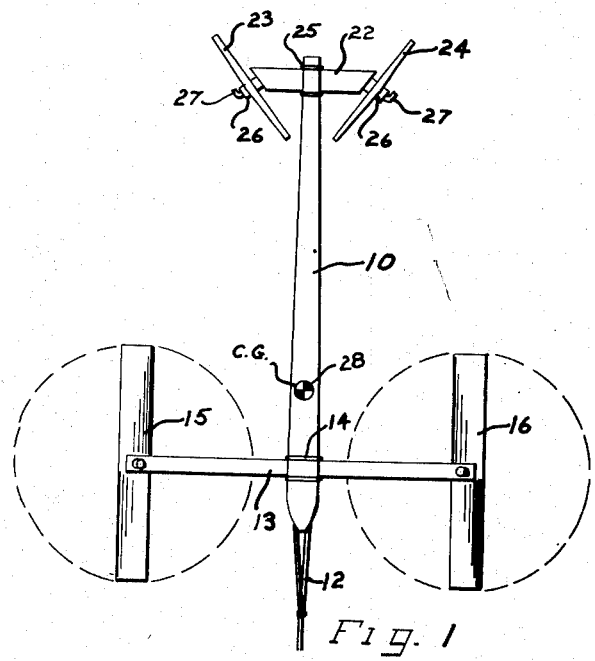
Figure 1 is a top plan view of a wind driven rotor kite embodying the principles of the present invention.
Figure 2:
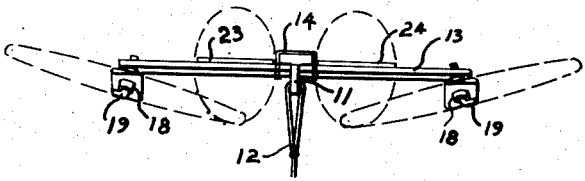
Figure 2 is a front elevational view of the kite of Figure 1.
Figure 3:
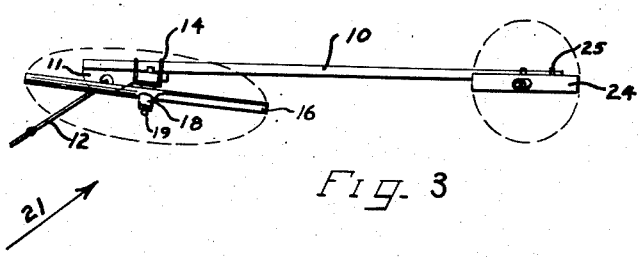
Figure 3 is a side elevational view of the kite of Figure 1 with an arrow indicating the relative direction of the wind with respect to the kite when in flight.

In greater detail, Figures 1, 2 and 3 illustrate a fuselage or body 10 comprising a simple, generally straight longitudinal member or frame having a tongue portion 11 at one end thereof to which a towline fastening may be made, such as by a towline 12. A cross-member 13 is fastened to the body 10 near the tongue portion 11 with portions extending laterally in a horizontal direction an equal distance on each side of the body to form outriggers for the kite.

The cross-member 13 may be fastened to the body 10 in any suitable manner which will secure it in place in relatively rigid relation to the body 10, but is preferably fastened by means which may be readily removed when desired. One such manner of fastening may be accomplished by utilizing a rubber-band 14, looped about both the cross-member and the body 10. It is readily understood, however, that many other means are available for accomplishing this purpose such as glue and cement or by establishing a dove-tail relationship between the parts.

A pair of lift-rotors 15 and 16 are mounted near opposite ends of the cross-member 13. This mounting is accomplished by providing a bushing 18 in the center of each of the rotors through which a mounting pin 19 passes, and which is inserted in press fit relation in holes provided in the cross-member 13. The free ends of the pins 19 are bent in angular relation so that the rotors will not slip off, but are so arranged that the rotors will not be prevented from freely rotating when located in the path of a driving wind. As may be seen in Figures 2 and 3, the lift rotors 15 and 16 which are located on the underside of the cross-member 13, are mounted with their axes inclined slightly forward and outwardly away from the body 10. The angle of inclination of the rotor axes is such that upward axial extensions therefrom intersect at a point above the body 10 and generally rearward of the cross-member. This places the rotors in proper position for facing on-coming winds and when rotated, cause them to move in planes which are dihedrally related to the plane within which the fuselage 10 and the cross-member 13 are disposed.

In Figure 3, an arrow 21 indicates the relative direction of the wind with respect to the device when it is in flight. It can be seen that the wind, when so directed against the rotors 15 and 16, will cause them to rotate, creating an axial or thrust force which will be transferred to the cross-member 13. If, however, no stabilizing means is associated with the combined rotors, the device tends to roll over so that the wind will have no lifting effect. The pair of rotors 23 and 24 mounted on horizontal axes are, therefore, provided at the rear of the body member 10, on a relatively short cross-member 22 which is secured to the body 10 by a rubber-band 25 or by any other means similar to that which may be utilized in securing the front cross-member 13 to the body 10. Cross-member 22 is provided with diagonally cut ends facing the forward part of the body. These ends provide bearing surfaces for bushings 26 of the rotors 23 and 24. Each of the rotors 23 and 24 is held by a pin 27 arranged to permit rotation of the rotors in a substantially vertical plane having an axis extending diagonally outward and forward. The pins 27 are press fit into holes provided in the bearing surface end of the cross-member 22 while their free ends are angularly bent to keep the rotors from slipping from their mounted position.

The center of gravity of the device is located on the fuselage 10, at a point 28, a slight distance behind the cross-member 13. Thus, when wind drives the rotors 15 and 16 causing the device to be lifted into flight, the weight concentration at the center of gravity 28 tends to make the back portion of the kite drop lower than the tongue portion 11, even though the towline 12 or anchoring means exerts a downward pulling force on the nose portion. The wind driving the rear rotors 23 and 24, however, causes an axial thrust force to be exerted on each of the pins 27, tending to make the body 10 more horizontal by reason of the horizontal components of such forces effecting a pull against the towline. The greater the velocity of the wind, the greater are the forces tending to make the fuselage 10 horizontal, but correspondingly greater lifting forces are provided by the front rotors 15 and 16. The angle of flight and stability of the device is, therefore, maintained relatively constant regardless of the velocity of the driving winds.

Stability of flight is further maintained by locating the fastening of towline 12 substantially within a plane passing through the hubs of rotors 15 and 16 parallel to the body 10. This arrangement minimizes the establishment of an undesirable force couple which would otherwise be created by the vertically displaced, oppositely directed horizontal components of force exerted at the towline fastening and rotors 15 and 16. Such a couple often results in an up and down oscillation of the front and back portions of the kite alternately, if not properly compensated for. By arranging the fastening in the above described manner, the oppositely directed horizontal components of force which would otherwise establish a couple, substantially cancel each other.

Figure 4:
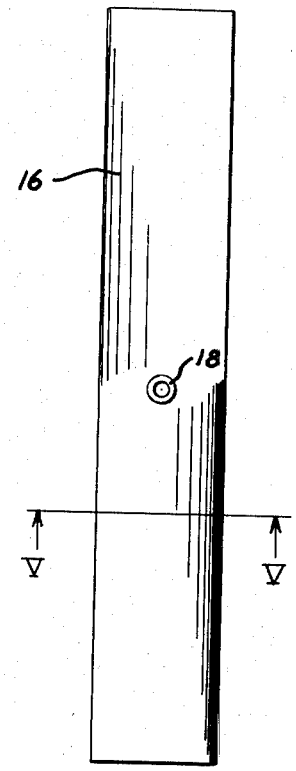
Figure 4 is an enlarged view showing the top of a rotor blade of a type which may be used in the embodiment of the invention shown in Figure 1.
Figure 5:
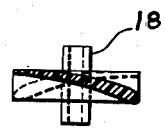
Figure 5 is a cross sectional view of the rotor blade shown in Figure 4 as taken on line V—V.

Figures 4 and 5 illustrate the type of rotor blade, such as blade 16, which may be utilized in the present invention. Figure 4 is a plan view of the rotor as seen from the side opposite to that approached by oncoming relative winds. It is obvious in Figure 5 that the rotor blades utilize air foil sections which have relatively small negative angles of incidence with respect to their plane of rotation. Such small angles of incidence are conducive to high rotational speed. The cross section and pitch of the blades are uniform, but also may be made to gradually decrease toward the blade tips, while the air foil sections face opposite directions on each side of the rotor hub. Although a specific type of blade is illustrated, it will be apparent to those skilled in the art that the present invention is not limited to utilization or construction with such a rotor blade only, since substantially all types of wind-driven rotors are capable of producing axial thrust forces during rotation and can be made to perform the functions of the rotors described in the present invention.

The direction of rotation of the blades in the present invention is immaterial since axial thrust forces can be produced regardless of direction of rotation of the blades. It has been found preferable, however, to have the lift blades 15 and 16 rotate oppositely in such directions that when their tips reach outwardly to their greatest distance away from the body 10, they move toward the rear of the body. This is not a critical requirement, but it has been found by experiment that even greater stability is obtained when this particular condition is effected. As to the direction of rotation of the rear drag propellers 23 and 24, experiments have shown that regardless of their direction of rotation, the effect is substantially the same. The dotted lines in Figures 2 and 3 illustrate clearly the planes or paths of movement of each of the blades 15, 16, 23 and 24.

Figures 6, 7 and 8 illustrate another embodiment of the present invention in which only three rotors are utilized and a drag tail is provided. In this embodiment, a pair of lift rotors 29 are dihedrally related; their axes being directed upward and slightly toward body 30 of the device. The rotors 29 are mounted on the ends of a pair of dihedrally extending side members 31, rigidly secured to the longitudinal body 30. The extension members 31 are supported by triangular reinforcing members 32 and 33, secured by means such as glue between the sides of body 30 and the upper surfaces of the members 31. The center of gravity of the device is behind the extension members 31. Thus, the rear portion of this device also hangs lower in flight than the front portion, similar to the manner in which the embodiment illustrated in the previous figures is sustained in flight.

The tail lifting force in this embodiment of the invention is provided by a rotor 35 mounted on an axis near the rear end of the longitudinal body 30 and perpendicular thereto. The rotor 35 is provided with a bushing 36 and is mounted on a shaft comprising a flat headed nail 37 passing through the bushing 36 and secured to the body 30. The end of the nail 37 extends to the bottom of the body 30 and is angularly bent to keep the rotor mounting from slipping from position.

The relative direction of the wind to the device when it is in flight is illustrated by the arrow 38 in Figure 8. The thrust force on the tail rotor 35 is directed vertically along its axis and thus tends to lift the tail portion of the body 30 with little restriction aside from the weight of the rear portion of the kite. To provide more stabilized flight conditions, a rag tail 39 is secured to the end of the body 30. Thus, when the wind blows against this tail combination, a horizontal component of force is exerted against the tail as well as the vertical component provided by the rotor 35. These two forces combine to establish a resultant force which maintains the kite in a stable flying position, substantially independently of wind velocity during practically all steady winds. Although this type of tail combination is shown in the present embodiment, it will be understood that it can be interchanged with the double rotor tail assembly of the above described embodiment.

It is possible to exert a certain amount of control over kites of this invention by providing apertures 41, 42 and 43 at spaced points along the body to enable one or more anchor or control lines to be tied to the body 30. By varying the angle of flight of the device by manipulation of control lines so connected to the kite, it may even be made to land at a very gradual rate of descent if desired. There are numerous points along the body where control line apertures may be provided to enable different flying characteristics, but normal sustained flight of the device requires but a single anchor line which may be secured to the front end of the body 30 through the aperture 41.

Figures 9 and 10 show still another form of tail combination which may be utilized with either of the above described embodiments. It will be noted that this combination is similar to that shown in Figure 8, but that a cone 44 is substituted for the drag tail 39. This cone 44 may be made either of paper or cardboard, or any other light weight formable material. The cone is assembled by rigidly cementing or gluing its apex portion to the very end of the body 30 with the flared-out portions extending rearwardly. It will be readily realized that when a kite is so arranged, the lower part of the flared-out cone tail, because of its more direct disposition with respect to on-coming winds, tends to offer a greater resistance to the wind than the upper portion of the cone. Thus a lifting force is established by the wind blowing against the lower part of the cone causing it to be raised until gravitational and wind forces establish a state of equilibrium. The tail cone 44 also exerts a horizontal component of force on the body 30, tending to keep the body 30 in a more horizontal stable flying position. The rotor 35 in this combination need not provide as much vertical lifting force as is required when it is in combination with a rag tail and, therefore, may be slightly smaller than the rotors used in association with rag tails alone.

While I have shown particular embodiments of my invention, it will, of course, be understood that I do not wish to be limited thereto since many modifications, both in the elements employed and their cooperative structure, may be made without departing from the spirit and scope of my invention. I contemplate, by the appended claims to cover any such modifications as fall within the true spirit and scope of my invention.

I claim as my invention:

1. A rotor type kite comprising a longitudinal body member, a pair of straight cross-members secured on portions of said body member oppositely disposed with respect to the center of gravity of said kite, wind operated lift rotors disposed on substantially opposite ends of one of said cross-members, each of said lift rotors having a downwardly extending axis of rotation reaching slightly outwardly away from said body member and in a direction slightly away from the opposite end of said body member, a stabilizing rotor disposed on each end of the other of said cross-members, said stabilizing rotors each having an axis of rotation in a plane substantially parallel to that in which said body and other cross-member lie, and being directly outwardly away from said body member and toward said one cross-member.

2. A rotor propelled kite comprising a longitudinal frame, a generally straight cross-member secured to the forward portion of said frame and extending outwardly from each side of said frame, plural bladed air driven lift rotors secured to the under side of said cross-member substantially at opposite ends thereof, said lift rotors having axes of rotation extending slightly away from each other, a flight stabilizing rotor assembly disposed on said frame rearwardly of said cross-member, and a connection for attaching a flexible towing member to said forward portion.

3. A rotor kite comprising a longitudinal frame, a generally straight cross-member secured to the forward portion of said frame and extending outwardly from each side of said frame, plural bladed air driven lift rotors secured to the under side of said cross-member substantially at opposite ends thereof, said lift rotors having axes of rotation extending slightly away from each other, a rotary flight stabilizer supported rearwardly of said cross-member on said frame, and a connection for attaching a flexible towing member to said forward portion, said connection being disposed substantially within a plane passing through the hubs of said lift rotors, parallel to said frame.

4. A rotor type kite comprising a longitudinal body member, a pair of straight cross-members secured on portions of said body member oppositely disposed with respect to the center of gravity of said kite, a wind operated lift rotor disposed on substantially opposite ends of one of said cross-members, said lift rotors having downwardly extending axes of rotation reaching slightly outwardly from said body member, stabilizing drag rotors supported on opposite sides of said body member on the other of said cross-members, said stabilizing drag rotors each having an axis of rotation in a plane substantially parallel to that defined by said body and other cross-member, and being directed outwardly away from said body member and toward said one cross-member, and line securing means disposed at the end of said body member adjacent said one cross-member, said line securing means being substantially within a plane parallel to said body member and passing through the hubs of said lift rotors thereby to further stabilize the flight characteristics of said kite.

5. A rotor kite comprising a longitudinal body, a pair of outriggers extending oppositely from said body between one end and the center of gravity of said kite, a lift rotor disposed on each of said outriggers, a second pair of outriggers extending oppositely from said body and supported thereon on the other side of the center of gravity of said kite, and a flight stabilizing drag rotor disposed on each of said second outriggers, said drag rotors each having an axis extending outwardly away from said body and toward said one end thereof.

References Cited in the file of this patent

UNITED STATES PATENTS

| Number | Name | Date |
|---|---|---|
| 1,849,133 | Baker | Mar. 15, 1932 |
| 2,008,424 | Stalker | July 16, 1935 |
| 2,074,327 | De Courcy | Mar. 23, 1937 |
| 2,151,349 | Fromme | Mar. 21, 1939 |
| 2,181,477 | Chupp | Nov. 28, 1939 |
| 2,287,257 | Lear | June 23, 1942 |
| 2,429,502 | Young | Oct. 21, 1947 |
| 2,442,846 | Dunn | June 8, 1948 |
| 2,453,857 | Platt et al. | Nov. 16, 1948 |
| 2,472,290 | Fernstrum | June 7, 1949 |
| 2,579,055 | Thompson | Dec. 18, 1951 |

FOREIGN PATENTS

| Number | Country | Date |
|---|---|---|
| 712,878 | Germany | Oct. 27, 1941 |